Figure 1:
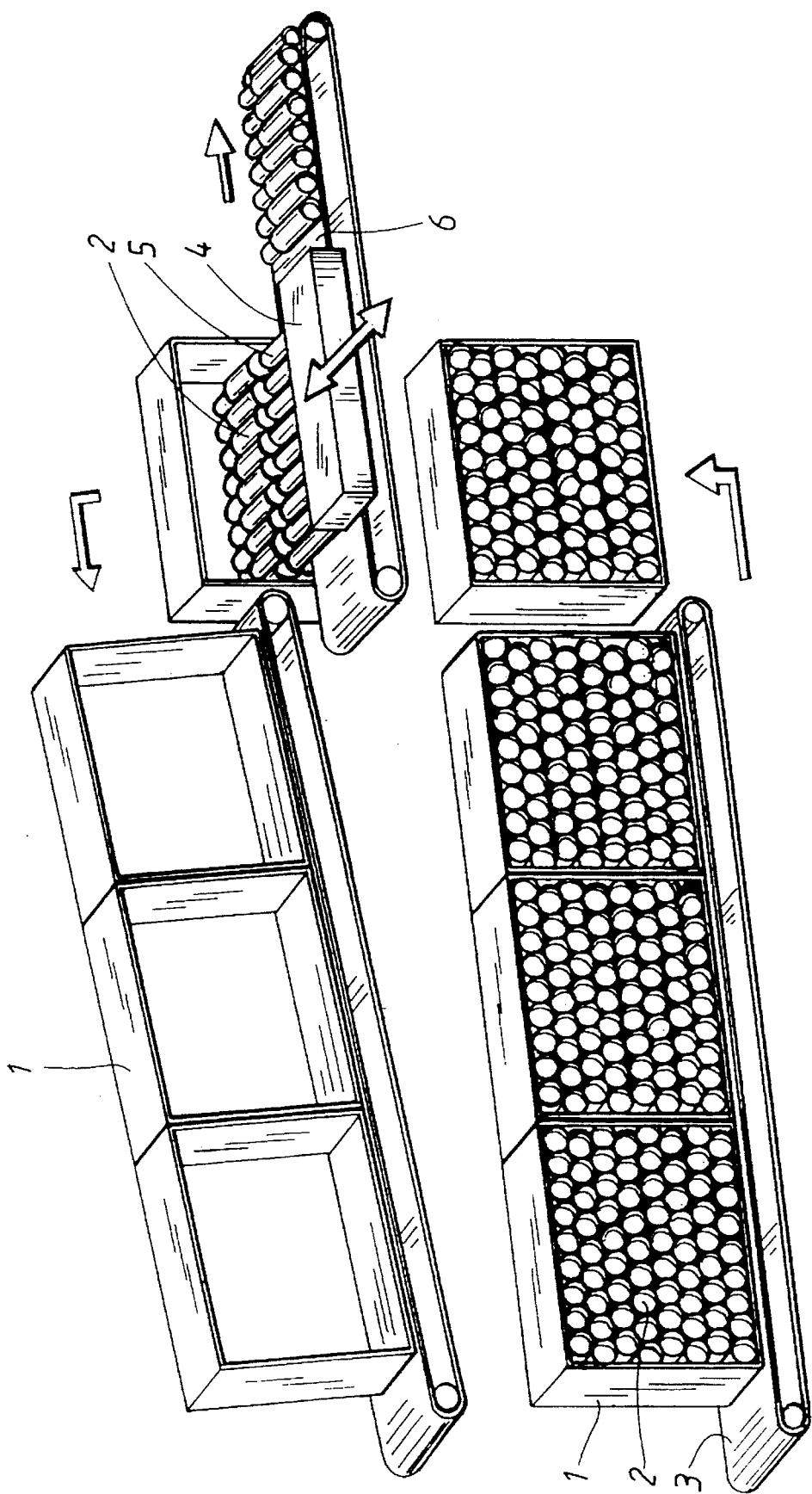

United States Patent

Linnér

[11] Patent Number: 5,524,416
[45] Date of Patent: Jun. 11, 1996

[54] TUBE PICKER

[75] Inventor: Hans Linnér, Kalmar, Sweden

[73] Assignee: Norden Pac Development AB, Sweden

[21] Appl. No.: 290,864

[22] PCT Filed: Feb. 8, 1993

[86] PCT No.: PCT/SE93/00097

§ 371 Date: Aug. 18, 1994

§ 102(e) Date: Aug. 18, 1994

[87] PCT Pub. No.: WO93/16923

PCT Pub. Date: Sep. 2, 1993

[30] Foreign Application Priority Data

Feb. 19, 1992 [SE] Sweden .................................. 9200485

[51] Int. Cl.⁶ ..................................................... B65B 43/28
[52] U.S. Cl. .............................. 53/251; 53/567; 414/416; 414/796.9
[58] Field of Search ................................. 414/416, 795.9, 414/796.2, 796.5, 796.9, 797.8; 53/249, 251, 567

[56] References Cited

U.S. PATENT DOCUMENTS

| 2,119,725 | 6/1938 | Stecher | 414/416 |
| 2,631,746 | 3/1953 | Holstebro et al. | 414/416 |
| 2,681,161 | 6/1954 | Lorenz et al. | 414/416 |
| 2,741,381 | 4/1956 | Bezien | 414/416 |
| 3,747,786 | 7/1973 | Reichert | 414/416 |
| 4,262,795 | 4/1981 | Hecker | 414/416 X |
| 4,901,504 | 2/1990 | Tsuji et al. | 53/249 X |
| 4,946,340 | 8/1990 | Murphy et al. | 414/796.9 X |
| 5,328,319 | 7/1994 | Fadaie | 414/416 |

FOREIGN PATENT DOCUMENTS

| 912362 | 8/1946 | France . |
| 3343542 | 6/1985 | Germany . |
| 214995 | 8/1967 | Sweden . |
| 353693 | 2/1973 | Sweden . |
| 449733 | 5/1987 | Sweden . |

OTHER PUBLICATIONS

Patent Abstracts of Japan, vol. 9, No. 213, M-408, Abstract of JP, A, 60-71422 (Sasaki Glass K.K.), 23 Apr. 1985.

Primary Examiner—W. Donald Bray
Assistant Examiner—Daniel Moon
Attorney, Agent, or Firm—Lerner, David, Littenberg, Krumholz & Mentlik

[57] ABSTRACT

The invention relates to a tube picker for picking out unfilled tubes which are to be filled with some mass, such as creams or the like. The tube picker comprises rigidly fixed fingers (5) on a movable support (7) intended to be inserted into the unfilled tubes (2) through their open bottoms and it is characterized in that on the support (7) in the vicinity of the rigidly fixed fingers (5) pins (10) have been mounted movable in relation to the fixed fingers intended to be put on the fingers (5) after they have been inserted into the tubes (2) and therethrough clamp these.

4 Claims, 3 Drawing Sheets

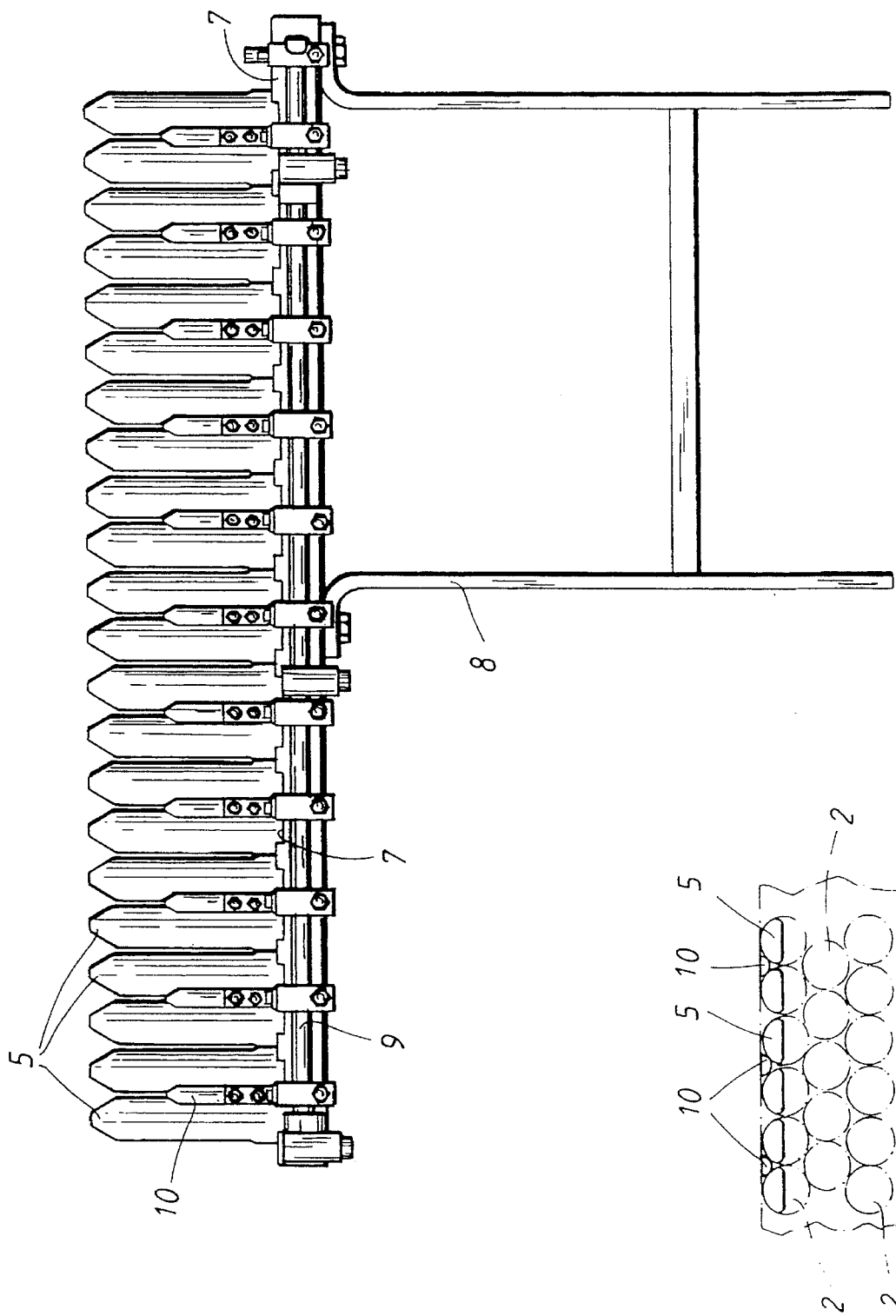
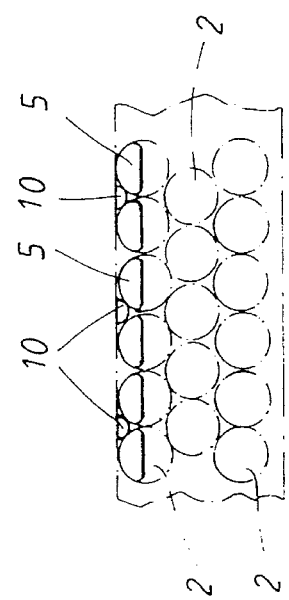

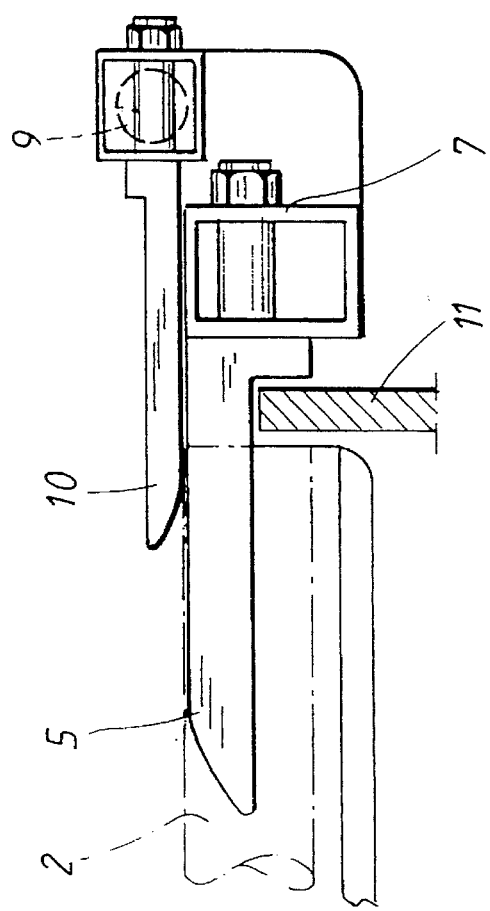
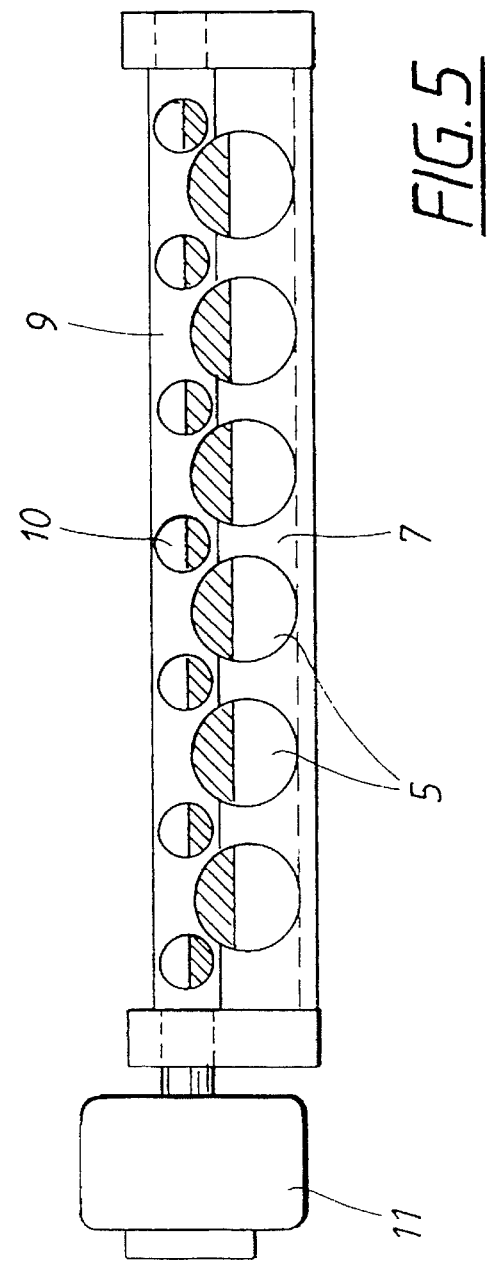

TUBE PICKER

TECHNICAL FIELD

The present invention relates to a tube picker for picking unfilled tubes having an open bottom from a container such as a cardboard box or the like to be placed on a band which is intended to transport the picked tubes to a filling station for these.

PRIOR ART

Within the packing industry machines for handling, filling and sealing of usual squeezing tubes have got a high degree of mechanising. Empty tubes having an open bottom are supplied in boxes to a tube filling machine at which these empty tubes automatically are picked up and placed on a moving line to the filling machine. Immediately before the filling machine the empty tubes are sucked clean from possible impurities.

A plurality of devices for picking empty tubes from boxes are known. A prior system is based on that one uses picking fingers which are provided with friction organs which are introduced into and act against the inner side of the empty tube. Different variants of these friction organs are known, but common for them is that rubber details are used which are subjected to wearing and aging so that they have to be replaced from time to time. Via the fact that these picking fingers require relatively exact guidance in relation to the empty tubes for having the picking fingers to hit the accurate positioning of every empty tube is required.

A more recent device for picking tubes from boxes is described in the Swedish patent 8504451-9. This system is based on using picking fingers which are hollow and at one end provided with a suction orifice. The picking fingers are connected to a fan which sucks air from them so that when the picking fingers are inserted into the tubes they will be sucked on the picking fingers. The tubes are thereafter lifted from the box and forwarded to for example a running conveyor where they are laid down either by having the tubes pushed off by means of an abutment or by taking away the subatmospheric pressure.

A further example of a tube picking arrangement is described in the British patent 2.203.404. The device according to this patent does also use picking fingers, but these are movable to the sides and they pick up the tubes by clamping the tubes against each other after the fingers have been introduced in the tubes and in this way pinch the tubes. The fingers in this device act in pairs and they are connected to each other by means of a spring which pulls them against each other. This also requires an arrangement which moves the fingers apart before the insertion in the tubes. The arrangement is hereby complicated and costly in manufacturing.

THE TECHNICAL PROBLEM

The problem connected with the above mentioned devices and other similar devices are that they partly are worn down and have to be adjusted (this applies especially to the rubber details) partly are complicated by requiring a subatmospheric pressure which must be maintained or having arrangements for moving apart and moving together the fingers have to be present.

THE INVENTION

According to the present invention one has solved the problems connected with the above mentioned arrangements and brought about a tube picker for picking of unfilled tubes having an open bottom from a container and putting these on a conveyor band or the like comprising rigidly fixed fingers on a movable support intended to be inserted in the unfilled tubes through their open bottoms, which tube picker is characterized in movably mounted pins on the support in the vicinity of the rigidly fixed fingers which are intended to be put on the fingers after the fingers have been inserted into the tubes and therethrough clamp the tubes.

It is according to the invention suitable that the pins are mounted above and between the fingers.

It is further according to the invention advantageous that every pin is intended to be put on two fingers whereby only half the number of pins in relation to the number of fingers have to be arranged.

It is further according to the invention suitable that the movably mounted pins are mounted on a turnable shaft, whereby they through turning of the shaft will be swingable against and from the fingers.

FIGURE DESCRIPTION

The invention will in the following be described more in detail in connection with the attached drawings, where:

FIG. 1 schematically and in perspective shows the transport to the picking arrangement of tubes, picking of these and the further transport on a conveyor, FIG. 2 shows the picking arrangement seen from above, FIG. 3 shows a front view of the picking arrangement according to FIG. 2, FIG. 4 shows a picking finger having a pin and a tube in detail and FIG. 5 shows a front view of the picking arrangement.

PREFERRED EMBODIMENT

FIG. 1 shows the principles for feeding empty tubes to a filling machine. The containers 1, which usually are cardboard boxes and which contain tubes 2 is transported on a conveyor band 3 to the picking device 4. At this the boxes which have been put on one side are lifted up with the picking arrangement 4 so that the uppermost row of the tubes 2 are flush with the fingers 5 of the picking arrangement 4. The fingers are inserted into the empty tubes 2, they lift them and put them thereafter on another conveyor 6, which transport the tubes further to the filling station. The empty boxes 1 are transported away on a third conveyor.

FIG. 2 shows the picking arrangement according to the invention separately. This consists of so called fingers 5, which in the present case have a number of 22. The number of the fingers can be regulated and adapted to the number of tubes in a row which all are lifted out of the box in one time. The fingers 5 are rigidly attached for example by means of bolts and nuts on a support 7. This support is in its turn fixed to a frame 8 which can be moved forwards and backwards. A shaft 9 is also arranged on the same frame. This shaft 9 is somewhat turnable and carries the pins 10, which in the present case have a number of 11, i.e. one pin exists for each pair of fingers 5. When the device shall be used the shaft 9 is somewhat turned so that the pins 10 are lifted up from the fingers 5 whereupon the whole row of fingers 5 are introduced into the open tubes at their bottoms. When the fingers 5 have come sufficiently long into the tubes the shaft 9 is turned in the opposite direction so that the pins 10 are put down on the outer side of the tubes and clamp these against the fingers 5. Thereafter the tube picking arrangement is moved backwards so that the tubes will come above a conveyor and are put down on this by letting the shaft 9 again be turned so that the pins 10 are lifted up from the fingers 5. The arrangements that are required for pushing the tube picking device into the tubes and for letting the shaft 9 turn, for example a turning cylinder are not shown as these are conventional devices.

FIG. 3 shows how the fingers 5 and the pins 10 cooperate. The fingers 5 are as appears inserted in the uppermost row of the tubes 2 and the pins 10 press against the tubes. When the uppermost row of the tubes 2 have been removed the lower rows are pushed up in a known way so that these can be taken away in their turn.

FIG. 4 shows more in detail the tube picker according to the invention. The finger 5, which has been screwed on the support 7 carries a tube 2 which is clamped against the finger 5 by means of the pin 10. This pin 10 has been fastened on a shaft 9 which is turnable and can lift the pin 10 up from the finger 5. The figure also shows a remover 11 which withholds the tube 2 when the finger 5 is pulled backwards and out of the tube. The remover 11 is accordingly located at the side of the conveyor 6 which transports the tubes 2 to the filling station.

FIG. 5 shows the picking device in a sideview. On the shaft 9 the pins 10 are screwed and on the support 7 the fingers 5 are located between and under the pins 10. In this embodiment a pin 10 has been arranged for each finger 5, which gives a safer clamping, but which usually is not necessary. A turning regulator 11 is schematically shown at the one end of the shaft 9.

The shape of the fingers 5 and the pins 10 is not critical, but they must be such that they partly can easily be inserted into the tubes, partly can safely clamp the tubes on the fingers. Usually the fingers are in section shaped as semi-circles whereas the pins 10 can consist of a rigid thread having a plastic cover at the end.

The guidance of the tube picker occurs in a way known per se. The machine comprises a dator which knows where the uppermost row of the tubes is located and lets the fingers come in a proper position in front of the tubes. The insertion of the fingers into the tubes and the withdrawal of these so that the tubes come over the conveyor, occurs in a conventional way. The lifting and lowering of the pins so that they come out of abutment or into abutment with the fingers through the turning of the shaft can occur by means of a turning cylinder as mentioned above or in some other way.

Through the present invention one has accordingly brought about a very simple tube picking device which is very safe in operation and which due to its simple construction is cheap to manufacture.

The invention is not limited to the embodiment in the example shown, but can be varied in different ways within the scope of the claims.

What is claimed is:

1. An apparatus for gripping substantially horizontally positioned tubular objects, each said tubular object having interior and exterior portions and longitudinal axis, said apparatus comprising:

an elongated support structure extending in the direction transverse to the direction of longitudinal axes of said tubular objects, said elongated support structure having an upper area and a lower area, a plurality of spaced fingers, said fingers being rigidly connected to said support arrangement at said lower area, a plurality of pins, said pins being mounted at said upper area of the support structure for pivotable movement about an axis transverse to said longitudinal axes of said tubular objects between an engaged condition and a disengaged condition, in said engaged condition each said finger contacts a limited part of the interior portion of the corresponding tubular object and each said pin contacts the exterior parts of two adjacent tubular objects, and in said disengaged condition said pins are positioned remotely from said tubular objects and said fingers.

2. The apparatus of claim 1, wherein each said pin projects into an area between said two adjacent fingers.

3. The apparatus of claim 4, wherein in said engaged condition each said finger contacts a limited upper part of the interior portion of the corresponding tubular object.

4. The apparatus of claim 1, wherein said elongated support arrangement is movable toward and away from said substantially horizontally positioned tubular objects.

* * * * *

UNITED STATES PATENT AND TRADEMARK OFFICE
CERTIFICATE OF CORRECTION

PATENT NO.   : 5,524,416
DATED        : June 11, 1996
INVENTOR(S)  : Hans Linnér It is certified that error appears in the above-identified patent and that said Letters Patent is hereby corrected as shown below:

Column 4, line 39, delete "4" and insert therefor --1--.

Signed and Sealed this

First Day of October, 1996

BRUCE LEHMAN

Attest:

Attesting Officer

Commissioner of Patents and Trademarks